United States Patent
Zaw et al.

(10) Patent No.: US 9,098,421 B2
(45) Date of Patent: Aug. 4, 2015

(54) SHINGLED MEDIA WRITE OPERATION

(71) Applicant: Seagate Technology LLC, Cupertino, CA (US)

(72) Inventors: Thien Than Zaw, Singapore (SG); Shen Feng, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 41 days.

(21) Appl. No.: 14/105,583

(22) Filed: Dec. 13, 2013

(65) Prior Publication Data
US 2015/0169460 A1    Jun. 18, 2015

(51) Int. Cl.
*G06F 3/06* (2006.01)
*G06F 12/08* (2006.01)
*G06F 13/38* (2006.01)

(52) U.S. Cl.
CPC ...... *G06F 12/0866* (2013.01); *G06F 2212/222* (2013.01); *G06F 2212/224* (2013.01)

(58) Field of Classification Search
None
See application file for complete search history.

(56) References Cited

U.S. PATENT DOCUMENTS

2014/0101515 A1*   4/2014   Akiyama et al. .............. 714/763

* cited by examiner

*Primary Examiner* — Scott Sun
(74) *Attorney, Agent, or Firm* — HolzerIPLaw, PC

(57) ABSTRACT

A method or system comprises determining an end data track of a write operation in response to a request for the write operation in a shingled media storage device, saving data from an adjacent track following the end data track to a cache, performing the write operation.

20 Claims, 4 Drawing Sheets

SHINGLED MEDIA WRITE OPERATION

BACKGROUND

As the requirements for data storage, retrieval, and analysis has increased, the need for cheaper and faster data storage devices has also increased. Data storage devices, such as disc drives, magnetic tapes, etc., store data on a different recording media using different storage technologies such as magnetic recording, optical recording, etc. Disc drives are widely used as data storage device in computing systems. To meet the increasing needs, disc drives providers have increased the capacity of the disc drives as well as the density of recording on the disc drives. At the same time, given the vast amount of data being stored and processed by users, storage device providers are under pressure to provide storage capacity at cheaper cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A method or system comprises determining an end data track of a write operation in response to a request for the write operation in a shingled media storage device, saving data from a track following the end data track to a cache, performing the write operation. These and various other features and advantages will be apparent from a reading of the following detailed description.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an implementation of a system for separately stored redundancy.

FIG. 2 discloses example data sources and flows for the virtual band re-write system disclosed herein.

DETAILED DESCRIPTIONS

Figure 1:
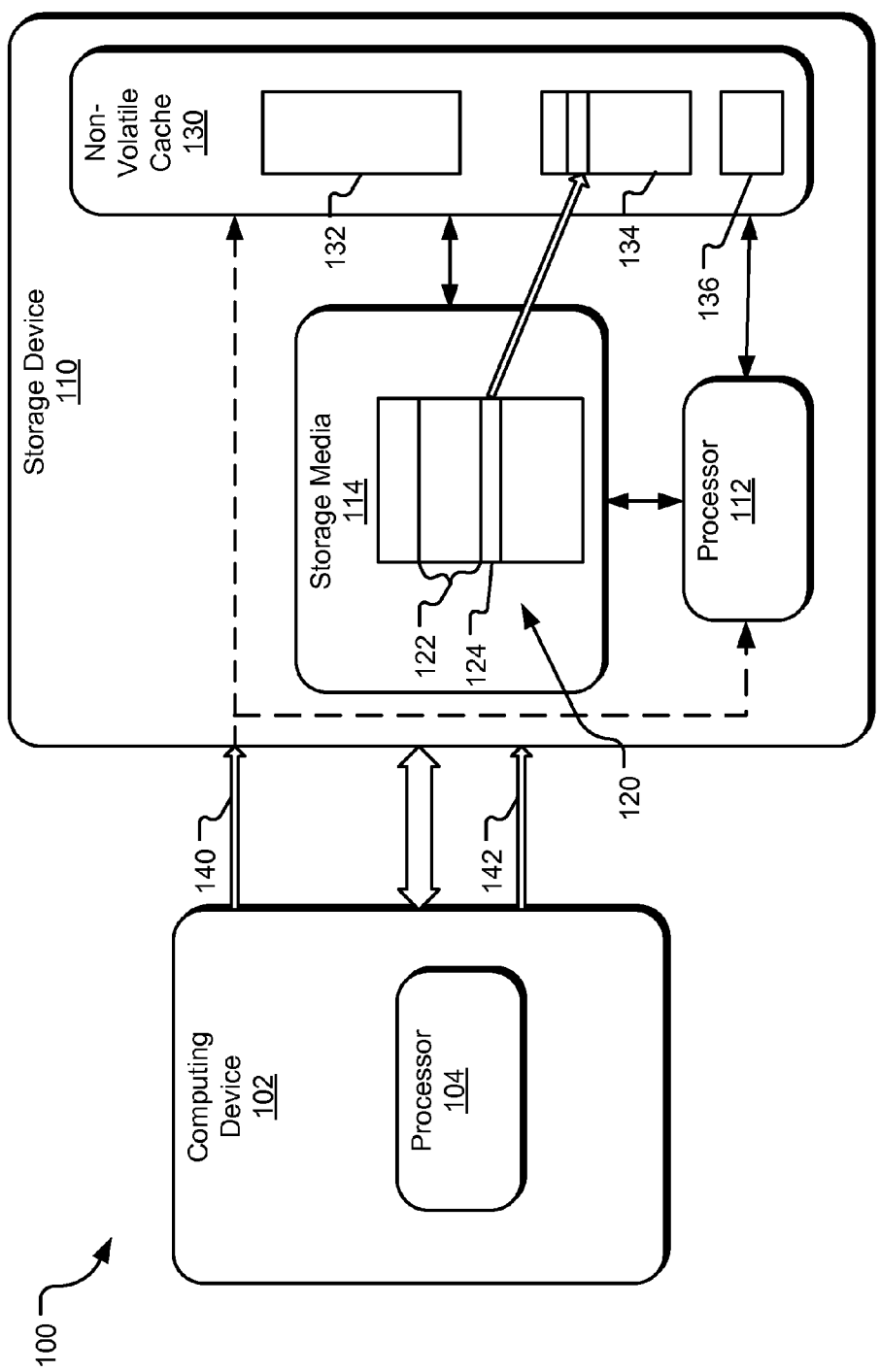

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent the discs.

The actuator assembly includes one or more plurality of actuator arms that extend towards the discs. Mounted at the distal end of each of the actuator arms is a head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a non-shingled magnetic medium, each of the cells on the magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of an adjacent cells (i.e., overwrite the adjacent cells). One technique for adapting the magnetic media to utilize smaller cells while preventing adjacent cells from being overwritten during a write operation is shingled magnetic recording (SMR).

Shingled magnetic recording utilizes a large strong write field generated by the write pole. One constraint of shingled magnetic recording is that when the data is written to the magnetic media, it is written in sequentially increasing or decreasing radius tracks. The strong write field overlaps a currently written track with a previously written track, leaving a relatively small strip of the previous write track unaffected, and also overlaps that currently written track with one or more not-yet-written tracks. The remaining strip of written data on the previously written track contains the aforementioned cells that, while merely a fraction of the feasible write size, are sufficiently large to be read using the read pole. As a result, while shingled magnetic recording still allows for traditional random access read operations, writes can no longer be done randomly because a single-track write modifies/overwrites the one or more not-yet-written (or yet-to-be written) tracks. As a result, in order to change any data cell within the shingled data, the entire shingled data is re-written in the selected sequential write order.

For example, in a disc drive using SMR, tracks on a disc are grouped together as a band and writing data to one track of the band may erase the data on the next adjacent track of that band. As a result, writing any data to a band requires writing data to the entire band. Thus, even if the amount of data to be written to a part of a band is small, the entire band has to be re-written to ensure that no data is lost during the write operation. As a result random write operations to parts of band on SMR disc drive takes more time than non-SMR disc drives. Such loss of time is specifically large in case of SMR disc drives with bigger band size, such as, for example, 100 tracks/band. However, using bigger band size is also useful in achieving more area density.

An implementation disclosed herein provides for efficient write operations on SMR bands to reduce the time taken for the write or rewrite operation. Specifically, a method disclosed herein includes determining an end data track of a shingled media write operation in response to a request for the write operation, saving data from a track following the end data track to a cache, and performing the shingled media write operation. Thus, for example, if a band comprises tracks $m_1$ to $m_{100}$ and a random write command specifies writing data to tracks $m_5$ to $m_{15}$, the method disclosed herein saves the data from track $m_{16}$ (the track following the last track as per the write command) into a cache and performs the write operation to tracks $m_5$ to $m_{15}$.

Subsequently, if a read command requests data from tracks including the track stored on the cache, a read and combine operation may be performed. For example, if a read command requests data from tracks $m_o$ to $m_{20}$, given that there has been no intervening write operation, data from tracks $m_0$ to $m_{15}$ and tracks $m_{17}$ to $m_{20}$ is read from the band and combined with data for the track $m_{16}$ from the cache to provide data from tracks $m_0$ to $m_{20}$.

Note that the above operations assume that a write operation to an SMR track affects one adjacent track. If more than one adjacent tracks are affected, such more than one tracks may be stored in the cache. Thus, if the SMR specification provides that three adjacent tracks are affected due to a write operation, then data from three tracks following the last track of the write operation are copied and saved to cache before performing a random write operation.

FIG. 1 discloses an example implementation of a storage system 100 using a shingled media write operation disclosed herein. Specifically, the storage system 100 includes a computing device 102 such a computer, etc., that reads data from and writes data to a storage device 110. The computing device 102 may include a processor 104 that communicates various read/write commands to the storage device 110. The storage device 110 may be a disc drive that stores data on a magnetic media, optical media, etc. In one implementation, the storage device 110 is an SMR disc drive that stores data according to shingled media recording techniques.

The storage device 110 may include, among other components, a processor 112, a storage media 114, a non-volatile cache 130, etc. While the implementation of storage device 110 illustrates the non-volatile cache 130 to be internal, in an alternative implementation, the storage device 110 may also be configured to communicate with an external non-volatile cache, which may be located on the computing device 102, or on other storage location. The storage media 114 includes a number of bands where data is stored. For example, the total storage space on the storage media 114 may be divided into 25 different bands, namely band a to band y, each band comprising fifty tracks. In the illustrated implementation, only one of the bands, specifically band m 120, is shown. Note that while the illustrated implementation shows band m using a rectangle, the actual band may include a number of consecutive tracks on a disc where each track is formed as a section of a circular storage track.

Band m 120 includes tracks $m_1$ to $m_{50}$. The computing device 102 may send a write command 140 to the storage device 110 to write data to a subset of consecutive tracks 122 including tracks $m_{10}$ to $m_{20}$. Furthermore, the storage media 114 may use shingled media recording such that writing to a given track affects one adjacent track. In this case, upon receiving the write command 140, the write data attached to the write command 140 is stored in the non-volatile cache 130. Subsequently, the processor 112 may cause the storage device to read data from the requested tracks $m_{10}$ to $m_{20}$ and from the track following track $m_{20}$, namely track $m_{21}$ 124 and store the data from the tracks $m_{10}$ to $m_{21}$ to the non-volatile cache 130.

The processor combines the write data stored in the non-volatile cache with the data read from the tracks $m_{10}$ to $m_{20}$ and writes the combined data on a media scratch pad 132. Furthermore, the data from the adjacent track $m_{21}$ is stored into the non-volatile cache 130 in a virtual rewrite cache 134.

Once the data from the adjacent track (or a number of tracks) is stored in the non-volatile cache 130, the processor 112 writes the data from the media scratch pad 132 to tracks 122 ($m_{10}$ to $m_{20}$). While performing such write may affect the data on the track $m_{21}$ 124, there is no need to rewrite data to track $m_{21}$. Furthermore, as no write to the track $m_{21}$ 124 is performed, there is no need to perform read and write to any of the following tracks $m_{22}$ to $m_{50}$. For example, the processor 112 may store information about the tracks that are stored in the local non-volatile cache 130 in a system area of the disc drive. For example, a table 136 on the local non-volatile cache 130 may store a listing of all tracks that may be affected due to a random write operation and for which the data is stored in the local non-volatile cache 130.

The storing of the data from track $m_{21}$ 124 into the virtual rewrite cache 134 before writing the data from the scratch pad 132 to the tracks $m_{10}$ to $m_{20}$ is particularly useful when the data from the write command 140 are predominantly in the first half of the band 120. Such an operation results in using space in the virtual rewrite cache 134 for one track but saving read modify write operations to the tracks following the track $m_{21}$ 124. As a result the numbers of tracks to read, modify, and write are lesser than not saving the track $m_{21}$ 124 into the virtual rewrite cache 134, resulting in saving of both time and power. Furthermore, as all of the data from the track $m_{21}$ 124 is written into the virtual rewrite cache 134 when tracks $m_{10}$ to $m_{20}$ are written to storage media 114, the problem of read fragmentation is also avoided.

Subsequently, when the processor 112 receives a read command 142 from the computing device, the processor 142 may first determine the tracks that are to be read and compare it with the track information stored in the table 136. For example discussed above, if the read command 142 requests data from tracks that include track $m_{21}$ 124, the processor 112 reads the data from the requested tracks and the data from the non-volatile cache 130 and combines the data as appropriate to serve the read command 142. For example, if the read command requested data read from tracks $m_{15}$ to $m_{25}$, the processor would read data from tracks $m_{15}$ to $m_{25}$ from the storage media 114 and combine it with the data from track $m_{21}$ as stored in the non-volatile cache.

Furthermore, the data stored on the non-volatile cache 130 may be written back to the storage media 114 at a later time when the processor is idle or not serving other data commands from the computing device 102. In one implementation, a band rewrite operation may be performed where all the data from the band 120 is read, combined with the data from the non-volatile cache 130, and written back to the band 120.

Figure 2:
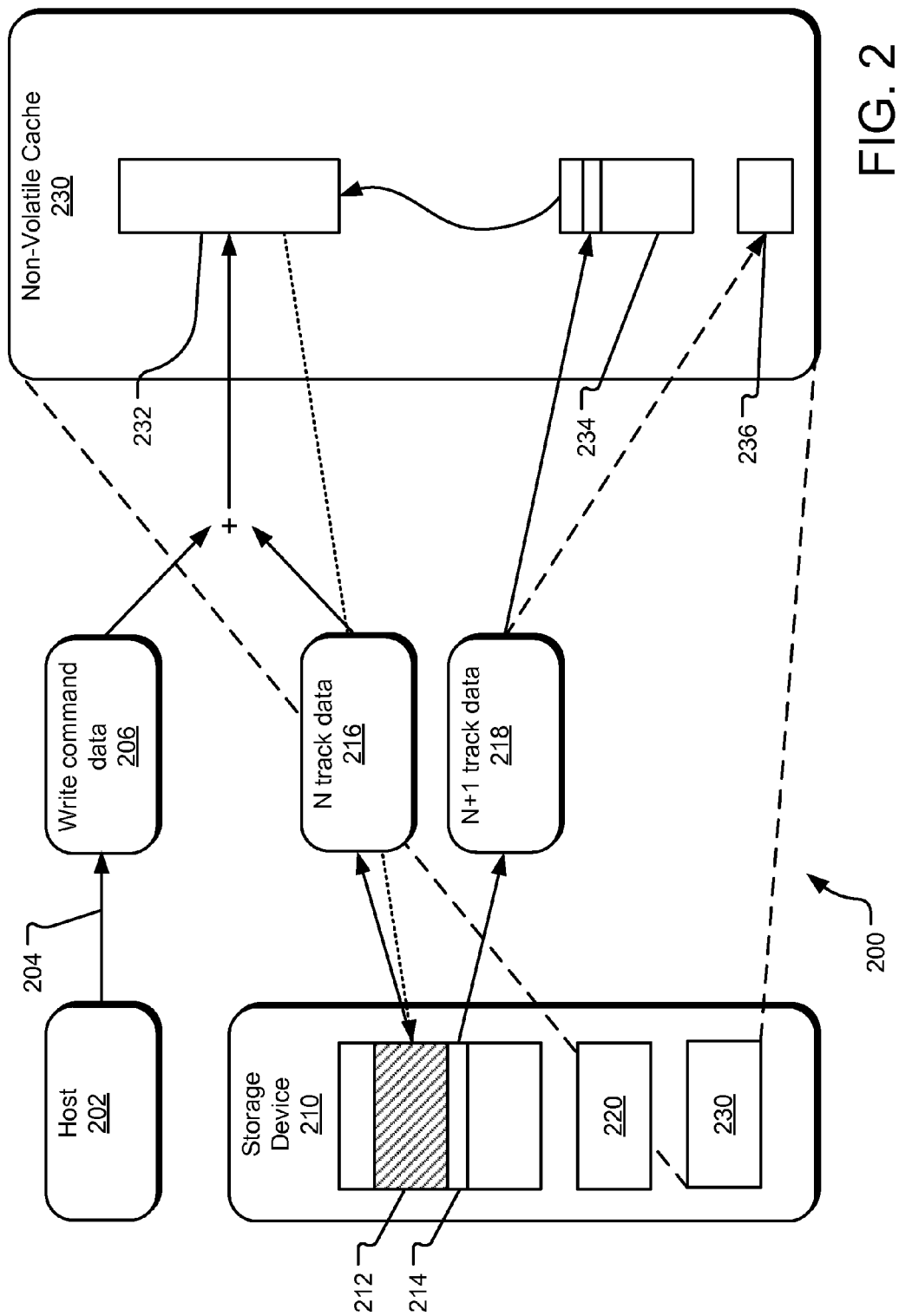

FIG. 2 discloses example data sources and flows 200 for the virtual band re-write system disclosed herein. A host 202 may be communicating with a storage device 210 to read and write data from the storage device 210. The host 202 may issue a write command 204 including write command data 206 to be written to the storage device 210. The storage device 210 may be a disc drive using SMR to store data in a number of bands including a band 220. In one implementation, the band 210 includes a plurality of tracks to store data. The storage device 210 also includes a storage media processor 208 to process various read, modify, and write operations to the storage device 210 and a non-volatile cache 230. In an alternative implementation, the non-volatile cache 230 may be external to the storage device 210.

The write command 204 may specify the storage device 210 to write the write command data 206 to a plurality of tracks 212 in the band 220. The storage media processor 208 saves the write command data 206 to a non-volatile cache 230. Based on the location of the plurality of tracks 212, the storage media processor 208 determines whether to use a virtual band rewrite operation. If it is determined that a virtual band rewrite operation is to be performed, the storage media processor 208 reads the N track data 216 from the plurality of data tracks 212 and the N+1 track data 218 from the N+1 track 214.

The storage media processor 208 combines the write command data 206 with the N track data 216 and stores the combined data to a media scratch pad 232 in the non-volatile cache 230. The storage media processor 208 also evaluates a listing cache 236, which may be stored in a system area of the disc drive, to determine whether data from any of the N tracks 212 is stored in a virtual rewrite cache 234 during a previous virtual band rewrite operation. If that is the case, the storage media processor 208 modifies the combined data in the media scratch pad 232 with the appropriate data from the virtual rewrite cache 234.

While serving the write command 204, the storage media processor 208 also stores the N+1 track data 218 to the virtual rewrite cache 234 and the information about the N+1 track 214 into the listing cache 236. Subsequently, the storage media processor 208 writes the combined data from the media scratch pad 232 into the plurality of tracks 212. In one implementation, the information stored in the virtual rewrite cache 234 and in the listing cache 236 is used to service subsequent read and write commands from the host 202.

Figure 3:
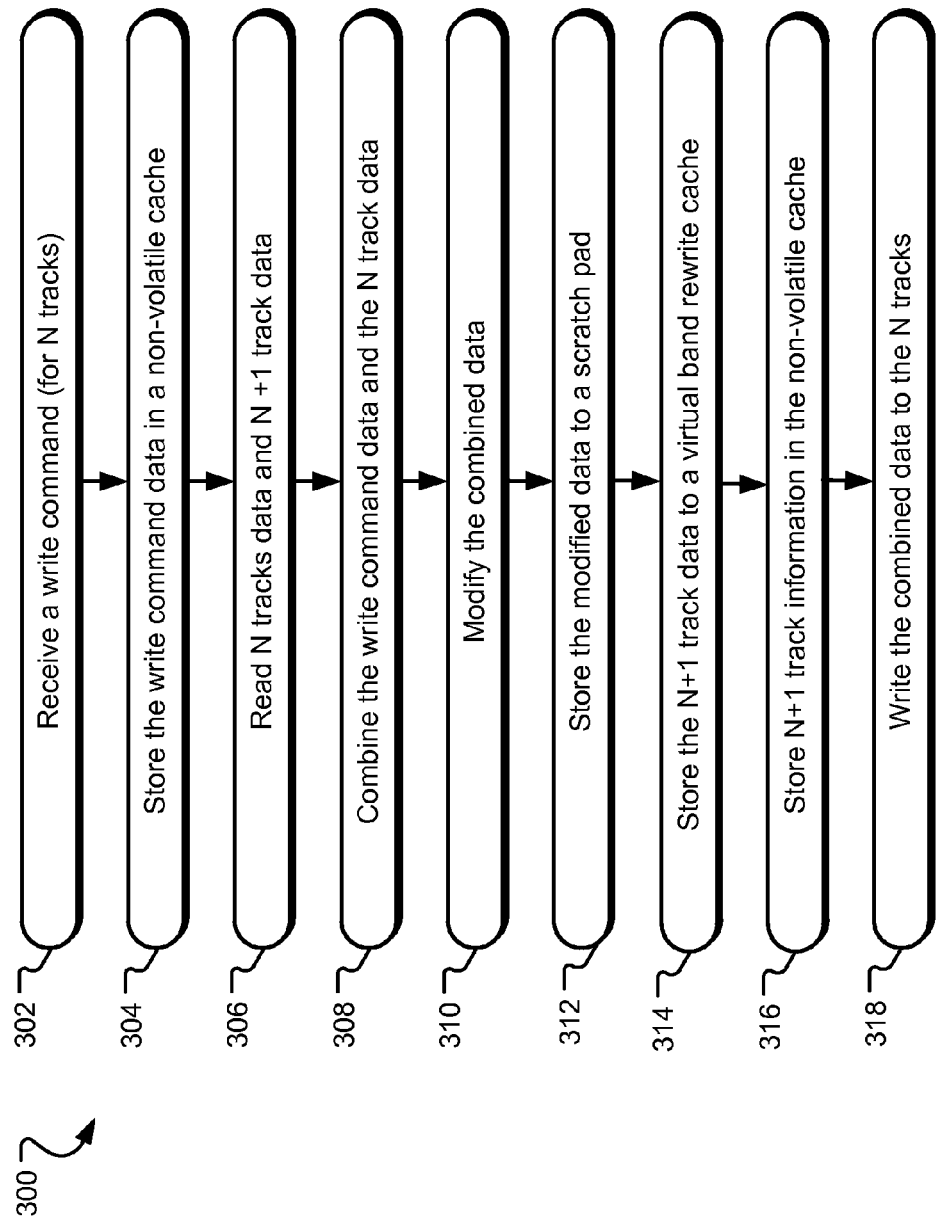
FIG. 3 illustrates example operations of the virtual band re-write system disclosed herein.

FIG. 3 illustrates example operations 300 of the virtual band re-write system disclosed herein. The Operations 300 may be used to write data to a disc drive using SMR. An operation 302 receives a write command from a host, wherein the write command data specifies write command data and specifies N tracks on a band where the write command data is to be stored. In response to the write command, a storing operation 304 stores the write command data in a cache. A reading operation 306 reads N track data from the N tracks and N+1 track data from an N+1 track. A combining operation 308 combines the write command data and the N track data.

If it is determined that the combined data stored on the scratch pad needs to be modified, a modifying operation 310 modifies the combined data. For example, if one of the N tracks may be affected by a previous virtual band rewrite operation, the data from such affected band is used to modify the combined data. Subsequently, a storing operation 312 stores the modified data into a scratch pad. Another storing operation 314 stores the N+1 track data to a virtual band rewrite cache and another storing operation 316 stores the N+1 track information to a listing cache in the non-volatile cache. A writing operation 318 writes the combined data (and modified, if appropriate) from the scratch pad to the N tracks on the storage media.

Figure 4:
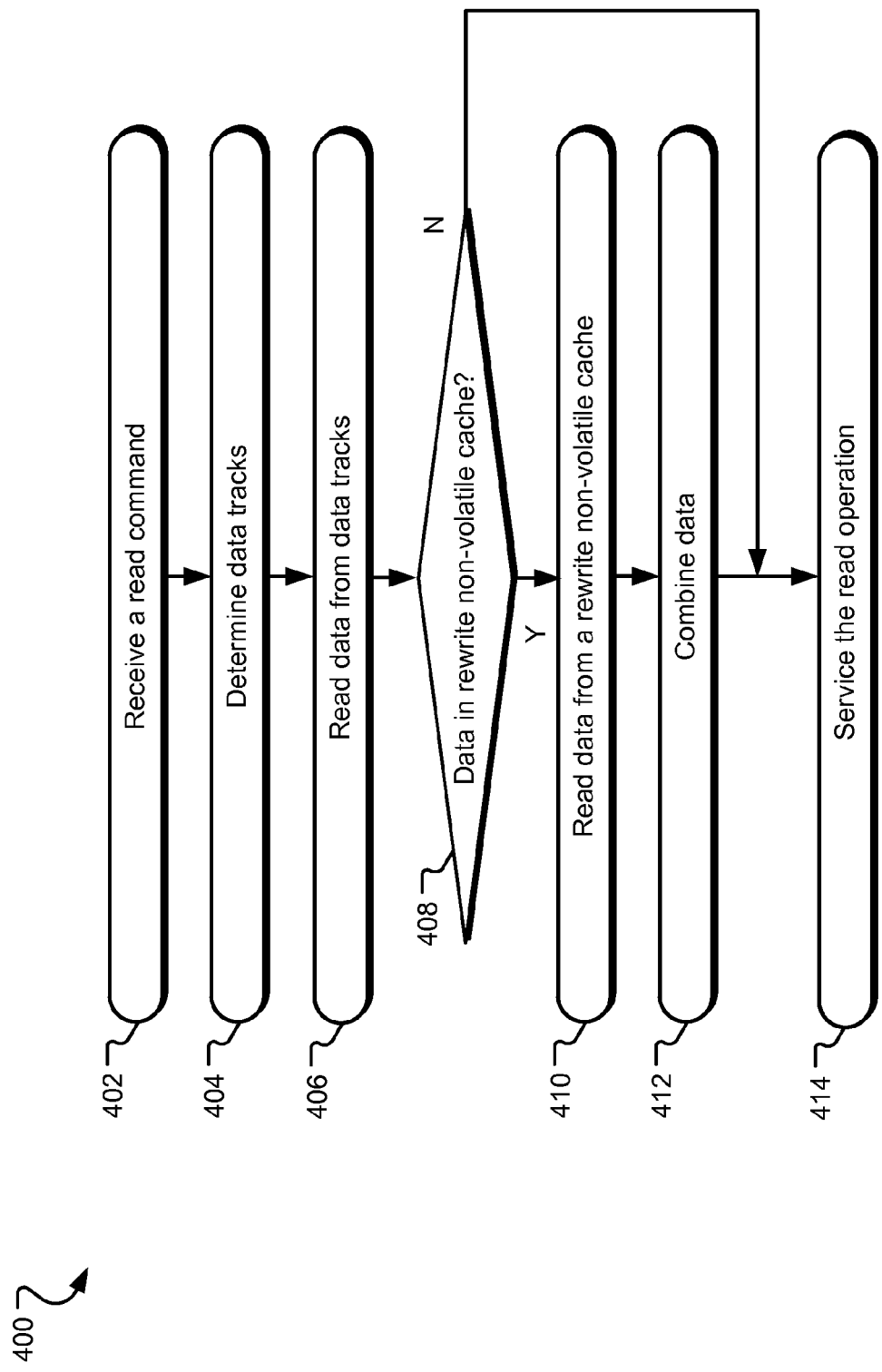
FIG. 4 illustrates alternative example operations for the virtual band re-write system disclosed herein.

FIG. 4 illustrates alternative example operations 400 for the virtual band re-write system disclosed herein. Specifically, the example operations 400 are used to read data from a disc drive that uses virtual band rewrite method disclosed herein. An operation 402 receives a read command from a host to read data from a band on an SMR disc drive. A determining operation 404 determines that number and location of the data tracks for the read operation. For example, the read command may specify reading data from track $p_{10}$ to track $p_{20}$ in a band p. and a reading operation 406 reads the data from the data tracks $p_{10}$ to $p_{20}$.

In this implementation, since the disc drive is using virtual band rewrite method to write data to a band, it is possible that one or more of the data tracks $p_{10}$ to $p_{20}$ is adversely affected by a previous write operation. Therefore, a determining operation 408 determines whether a non-volatile cache includes any data for one or more of the tracks $p_{10}$ to $p_m$. The determining operation 408 may review a listing cache to see any of the tracks $p_{10}$ to $p_{20}$ are listed therein. For example, if a previous virtual band write operation involved writing data to tracks $p_5$ to $p_{is}$, the data from the track $p_{16}$ would be stored in a rewrite non-volatile cache and the address of the track $p_{16}$ would be in the listing cache.

In this case, a reading operation 410 reads data from the rewrite non-volatile cache and a combining operation combines the data read from the tracks as specified by the read operation with the data from the rewrite non-volatile cache. A servicing operation 414 uses the combined data to serve the read operation. However, if none of the tracks as specified by the read operation are affected by previous virtual band write operations, the servicing operation 414 uses the data read from the specified tracks to service the read operation.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application—and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   determining an end data track of a write operation in response to a request for the write operation in a shingled media storage device;
   storing data from an adjacent track following the end data track to a cache; and
   performing the write operation.

2. The method of claim 1, wherein performing write operation comprises writing data to a plurality of data tracks in a band.

3. The method of claim 1, further comprising storing information identifying the adjacent track to the cache.

4. The method of claim 1, wherein storing data from an adjacent track following the end data track to a cache further comprises storing data from a plurality of tracks following the end data track.

5. The method of claim 1, wherein the shingled media storage device is configured to store data on a plurality of band, each band comprising a plurality of tracks.

6. The method of claim 5, further comprising:
   determining a location of the end data track on one of the plurality of bands; and
   storing the data from an adjacent track following the end data track to a cache if the end data track is within a first half of the one of the plurality of bands.

7. The method of claim 1, further comprising:
   reading existing data from the data tracks specified by the request for the write operation;
   combining write command data specified by the request for the write operation with the existing data; and
   performing the write operation using the combined data.

8. The method of claim 7, further comprising:
   determining if one of the data tracks specified by the request for the write operation is an affected data track affected by a pervious write operation; and
   if one of the data tracks specified by the request for the write operation is an affected data track affected by a pervious write operation: reading affected data track data from a cache and modifying the combined data using the an affected data track data.

9. The method of claim 7, further comprising:
   receiving a data read request;
   reading data from data tracks specified by the data read request;
   determining if one of the data tracks specified by the data read request is an affected data track affected by a pervious write operation; and
   if one of the data tracks specified by the data read request is an affected data track affected by a pervious write operation: reading affected data track data from a cache and modifying data from data tracks specified by the data read request using the affected data track data.

10. A storage device comprising:
    a storage media configured to store data using shingled media recording (SMR); and
    a processor configured to determine an end data track of a write operation in response to a request for the write operation to the storage media, store data from an adjacent track following the end data track to a cache; and perform the write operation.

11. The storage device of claim 10, wherein the storage media is configured to store data on a plurality of bands each band comprising a plurality of tracks.

12. The storage device of claim 11, wherein the processor is further configured to store an address of adjacent track following the end data track to the cache.

13. The storage device of claim 12, wherein the processor is further configured to store data from a plurality of tracks following the end data track.

14. The storage device of claim 12, wherein the cache is configured on the storage device.

15. The storage device of claim 12, wherein the cache is configured off the storage device.

16. A system comprising:
    a storage media configured to store data using shingled media recording (SMR);
    a processor configured to determine an end data track of a write operation in response to a request for the write operation to the storage media and to read data from an adjacent track following the end data track to a cache; and
    a non-volatile cache configured to store the data read from the adjacent track to a virtual rewrite cache.

17. The system of claim 16, wherein the storage media in further configured to store data on a plurality of bands, each of the plurality of bands including a plurality of tracks.

18. The system of claim 17, wherein the processor is further configured to read data from a plurality of adjacent tracks following the end data track to a cache.

19. The system of claim 17, wherein the processor is further configured to read data from a plurality of data tracks specified by the request for the write operation, combine the read data with write operation data specified by the request for the write operation, and store the combined data to a media scratch pad on the non-volatile cache.

20. The system of claim 19, wherein the processor is further configured to modify the combined data with data from the virtual rewrite cache and to write the modified data to the storage media.

* * * * *